Figure 1:
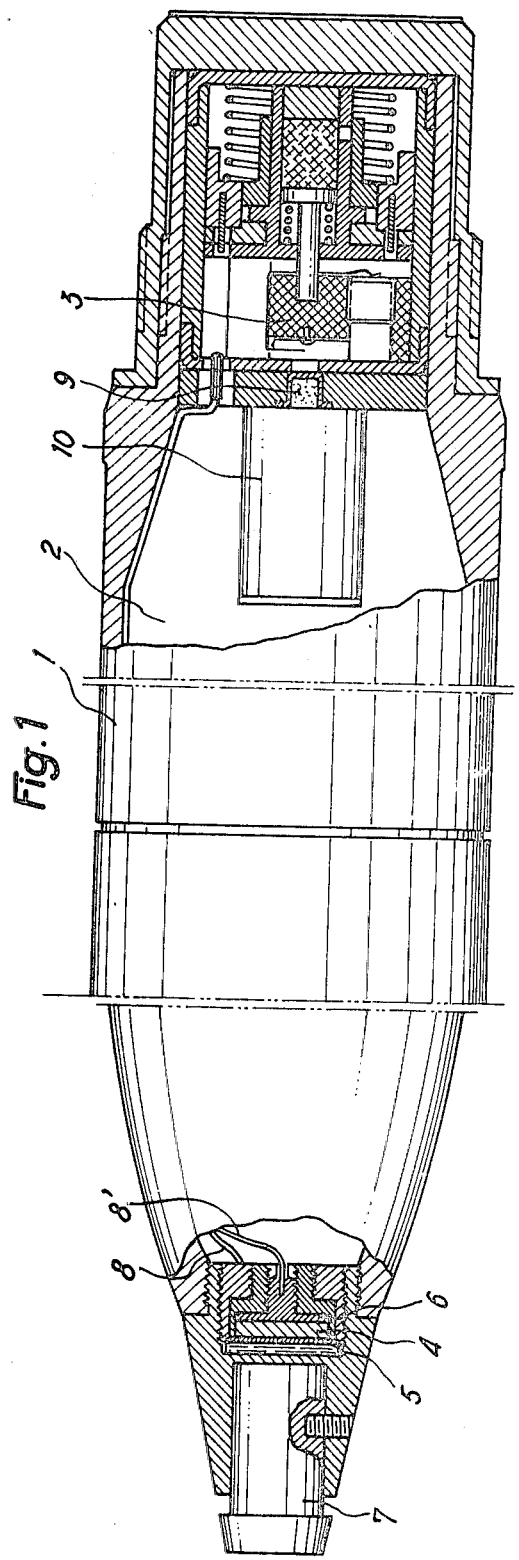

United States Patent

[11] 3,633,511

| | | | |
|---|---|---|---|
| [72] | Inventor | Louis Maury Toulouse, France | |
| [21] | Appl. No. | 875,884 | |
| [22] | Filed | Nov. 12, 1969 | |
| [45] | Patented | Jan. 11, 1972 | |
| [73] | Assignee | E. Lacroix Toulouse, France | |
| [32] | Priority | Nov. 13, 1968 | |
| [33] | | France | |
| [31] | | 173462 | |

[54] ROCKET FUSE WITH DELAYED-ACTION ARMING
5 Claims, 11 Drawing Figs.

[52] U.S. Cl. ................................................. 102/80, 102/78
[51] Int. Cl. ..................................................... F42c 15/26
[50] Field of Search ............................................ 102/702, 79, 80, 70, 78

[56] References Cited
UNITED STATES PATENTS

| | | | |
|---|---|---|---|
| 2,331,633 | 10/1943 | Spooner | 102/79 X |
| 2,455,620 | 12/1948 | Sreb | 102/79 X |
| 2,971,463 | 2/1961 | Burrell | 102/80 X |
| 2,977,883 | 4/1961 | Czajkowski | 102/79 |
| 3,320,891 | 5/1967 | Holmes | 102/79 X |
| 3,425,354 | 2/1969 | Carlson | 102/79 |

FOREIGN PATENTS

| | | | |
|---|---|---|---|
| 17,795 | 1905 | Great Britain | 102/80 |

*Primary Examiner*—Samuel W. Engle
*Attorney*—Breitenfeld & Levine

ABSTRACT: A rocket fuse with delayed-action arming comprises a fixed cylinder containing microballs and a spring-loaded plunger in the cylinder tends to force the balls out through a calibrated orifice. In the stored position the orifice is closed by a closing ring which can slide on the cylinder with a helical movement to open the orifice at the end of such movement. The movement takes place due to inertia when the rocket is launched and the ensuing movement of the plunger is used to arm the detonator.

INVENTOR
LOUIS MAURY
By Breitenfeld & Lewis
ATTORNEYS

INVENTOR
LOUIS MAURY

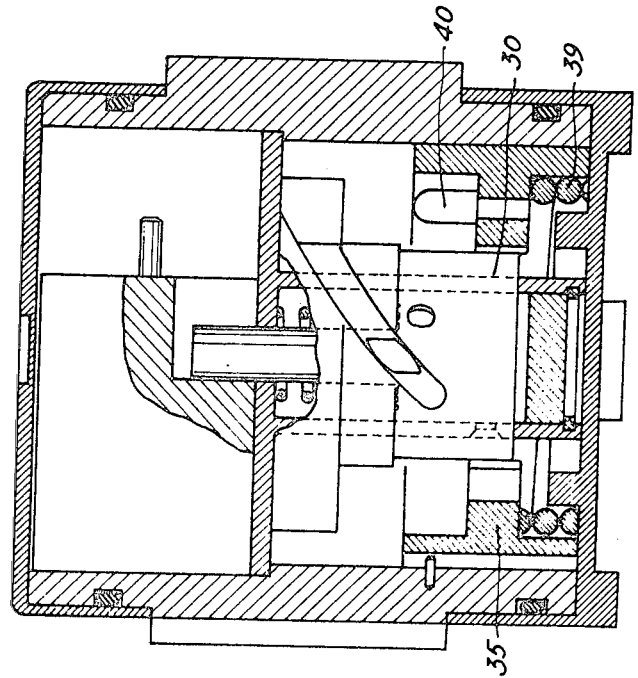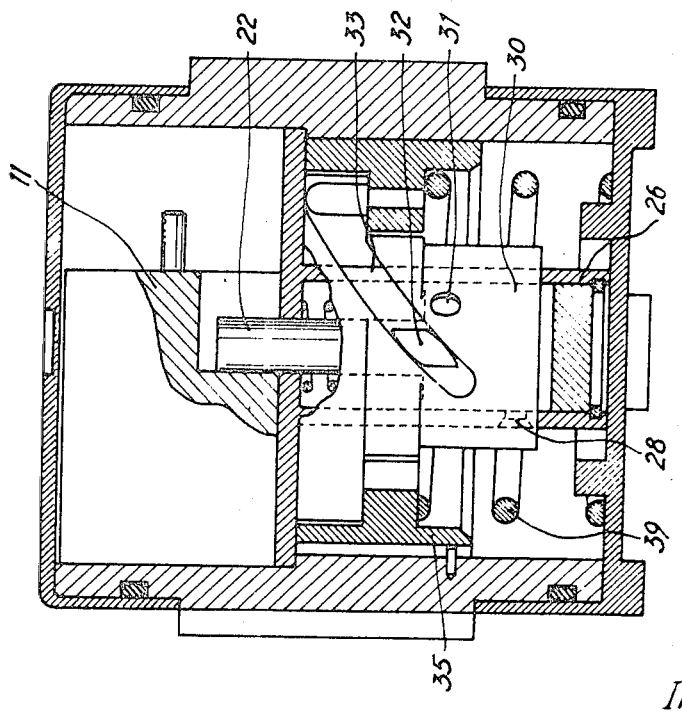

ROCKET FUSE WITH DELAYED-ACTION ARMING

The present invention relates to a rocket fuse with a delayed arming action.

A rocket fuse comprises a hollow charge and means for igniting this charge at the instant of impact of the rocket with the target. The means for igniting the charge comprise a detonator, which is generally electric, a delay device which allows the detonator to perform its function only after a certain delay, and a safety device or catch, generally a pin, which is operated before the rocket starts off and which renders the delay device operative, the detonator being subjected to an electric voltage only at the instant of impact on the target.

The main drawback of these fuses arises from the use of a manual safety element which is withdrawn before the rocket is fired. The safety element having been removed, the rocket must be used immediately and any delay in the use of the rocket may cause accidents.

Moreover, the impact of the rocket may occur accidentally too near the firing point, causing damage without it being possible to take action.

The object of the present invention is to provide a rocket fuse which does not include a manual safety device or catch.

To this end, the rocket fuse includes a delay arming device comprising a fixed cylinder designed to contain microballs and in which there slides a plunger subjected to a resilient force which tends to push the microballs through a calibrated orifice in the cylinder, the plunger being provided with a rod which blocks the passage of the detonator towards its operating position; a closing ring having an outlet orifice for the microballs and a flange and mounted to slide on the cylinder with a helical movement, so that under the effect of the acceleration on the starting off of the rocket the closing ring undergoes a helical sliding action such that the outlet orifices of the cylinder and the ring come opposite each other, permitting the exit of the microballs; and an arming ring mounted slidably on the closing ring and having a flange cooperating with the flange of the closing ring under the effect of a spring to hold the closing ring in a position in which the two outlet orifices are not opposite each other, the inertia on the starting off of the rocket compressing this spring and causing the arming ring to slide so that the closing ring is released for effecting its helical movement.

Figure 3:
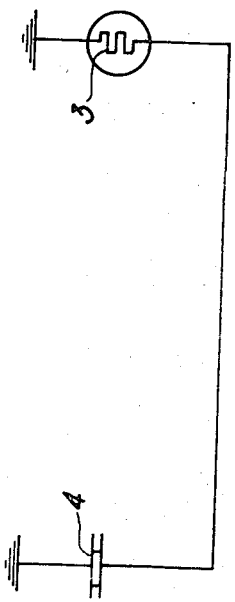
Figure 2:
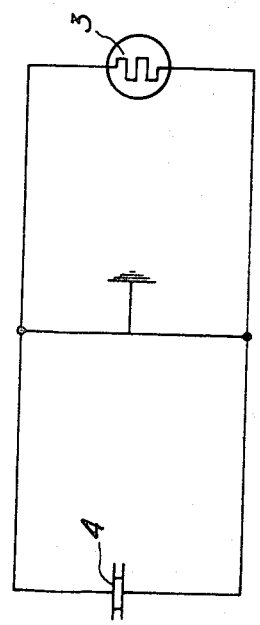
Figure 4:
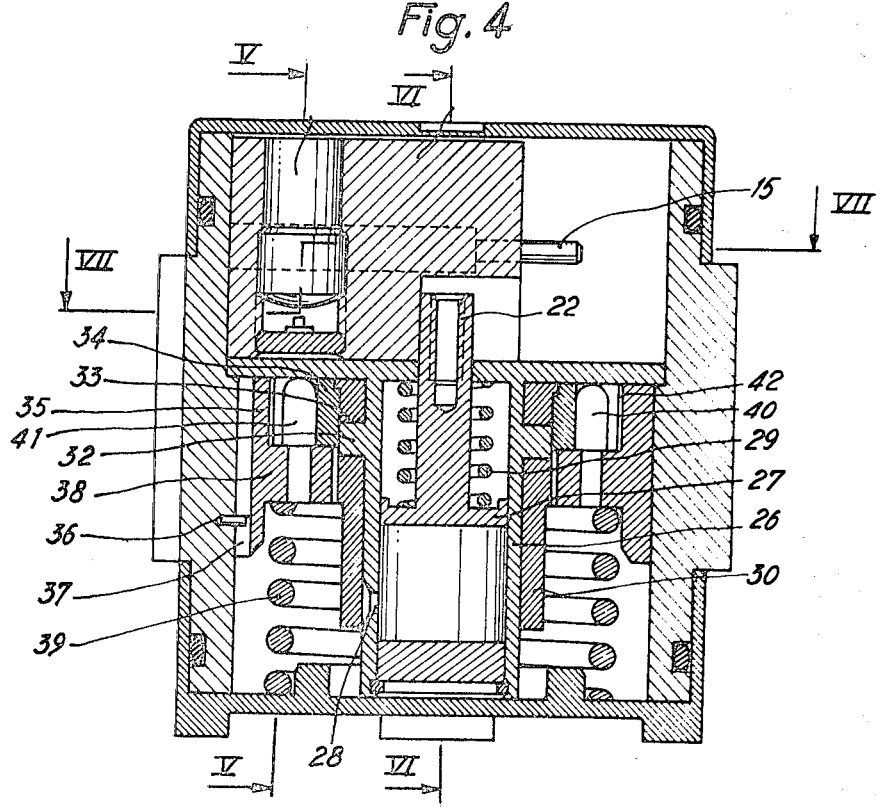
Figure 5:
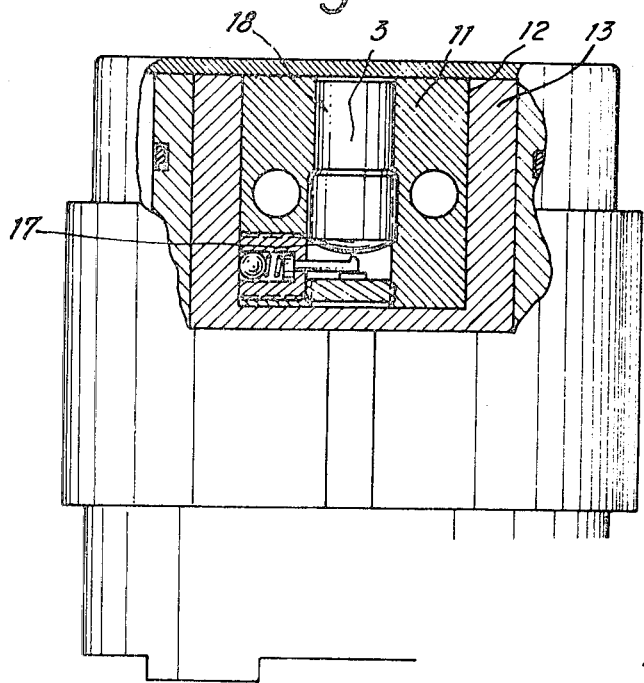
Figure 6:
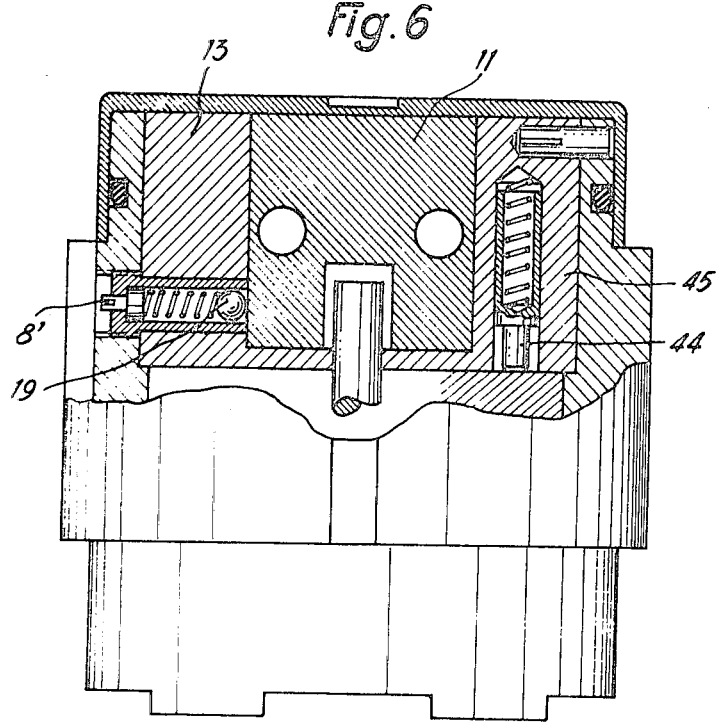
Figure 7:
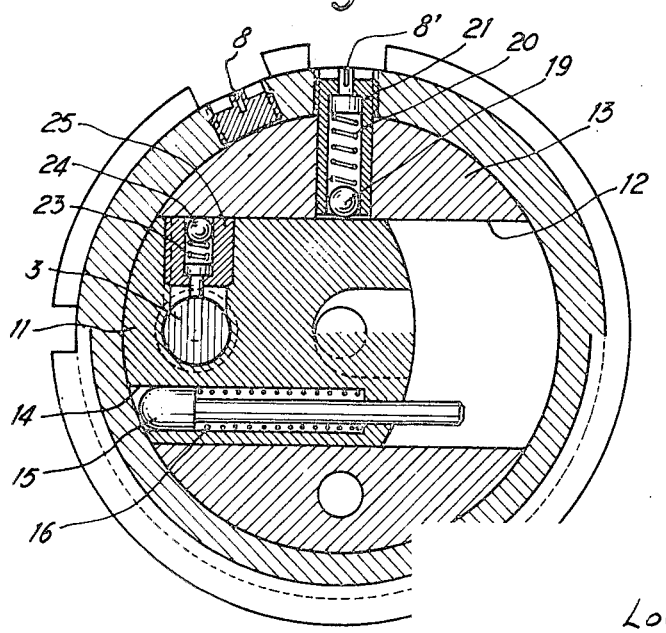
Figure 11:
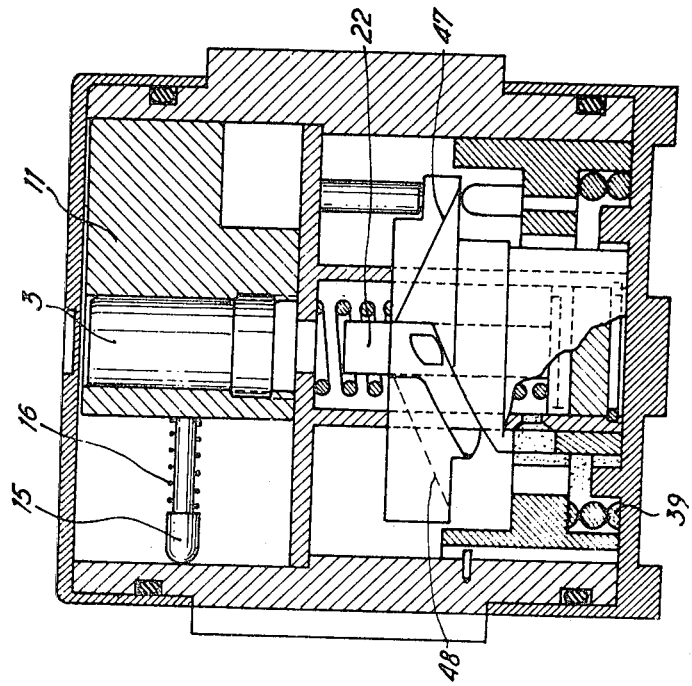
Figure 10:
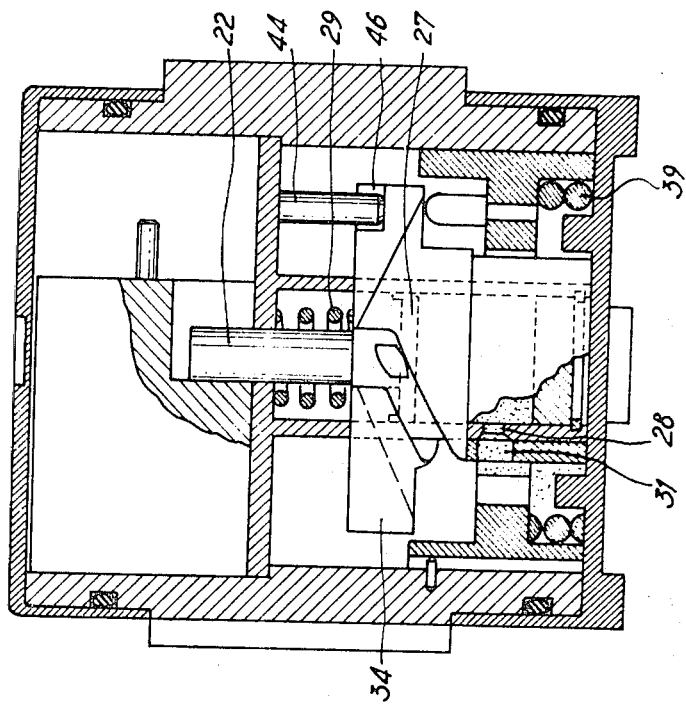

In order to make it better understood how the present invention can be carried into effect, a preferred constructional form of the rocket fuse according to the invention will now be described by way of nonlinitative example with reference to the accompanying drawings, in which:

FIG. 1 is a general view, partly in section, of the rocket fuse;
FIGS. 2 and 3 show the electrical ignition circuit in the unarmed state and in the armed state;
FIG. 4 is an axial section of the arming device;
FIGS. 5, 6 and 7 are sections of the detonator-carrying slide of FIG. 4 on the lines V—V, VI—VI and VII—VII, respectively;
FIG. 8 is a partial section of the arming device in the storage position;
FIG. 9 is a partial section of the arming device at the beginning of the acceleration of the rocket;
FIG. 10 is a partial section of the arming device at the end of the movement of the closing ring under the effect of the acceleration; and
FIG. 11 is a partial section of the arming device in in the armed state.

In FIG. 1, the reference 1 designates the body of the rocket fuse and the reference 2 the hollow charge contained in the body 1.

At the rear of the fuse there is an electric detonator 3. The detonator 3 is subjected to an electric voltage at the instant of impact of the fuse with a target, in the course of which impact a piezoelectric quartz crystal plate 4 with silver-plated faces 5 and 6 subjected to a violent shock through the medium of a member 7 located at the tip of the rocket fuse. The quartz crystal plate 4 is connected to the detonator 3 by the wires 8 and 8'. The detonator ignites a charge 9 forming a relay, which itself ignites a so-called "buster" charge 10, the last-mentioned charge transmitting a flame to the charge 2, which explodes.

During storage of the device, the detonator 3 and the quartz crystal plate 4 are short-circuited, as can be seen in FIG. 2. When the device is armed, the short circuit is eliminated and the detonator is connected to the terminals of the piezoelectric quartz crystal plate 4. (The practical embodiment of these diagrams is shown in FIG. 7). The shock of the impact then produces an electric voltage in the quartz crystal plate and this ignites the detonator.

As can be seen in FIG. 4, the detonator 3 is mounted in a slide 11 which is mounted slidably in a track 12 machined in the wall 13. The slide has a blind bore 14 in which there is mounted a rod 15 urged by a spring 16 against the casing 2 (FIG. 7) and tending to displace the slide. The detonator 3 has two contacts, one contact 17 being on the base (FIG. 5) and the other contact 18 being constituted its case. It will be seen in FIG. 7 that the wire 8 is always connected to the case 18 of the detonator 3 through the wall 13 and the slide 11. On the other hand, the wire 8' is connected to a ball 19 by a spring 20 which applies said ball against the wall of the slide 11 (the spring 20 and the ball 19 are located in an insulating sleeve 21). It can therefore be seen that the wires 8 and 8' are short-circuited, as are the two contacts of the detonator.

A rod 22 prevents movement of the slide 11. On the arming of the rocket fuse, this rod is retracted in front of the slide 11, so that the slide is displaced under the effect of the rod 15 and the associated spring 16 and brings the detonator into the arming position. In this position, the contact 17 of the detonator is connected to the wire 8' through the medium of a spring 23, a ball 24 (mounted in an insulating sleeve 25), the ball 19 and the spring 20. It can therefore be seen that the two contacts of the detonator are connected to the two terminals of the piezoelectric quartz crystal plate (FIG. 3).

The delay-action arming device according to the invention which enables the rod 22 to be retracted in front of the slide 11 will now be described.

This arming device includes a fixed cylinder 26 forming a magazine for microballs. In the cylinder 26 there is slidably mounted a plunger 27 which has a tendency to push microballs through a calibrated orifice 28 in the cylinder 26 under the effect of a spring 29. Mounted to slide on the cylinder with a helical movement is a closing ring 30 which, in the storage position shown in FIG. 4, covers the outlet orifice 28 for the microballs. The closing ring 30 has an orifice 31 (FIG. 8) located in such manner that it comes opposite the orifice 28 of the cylinder 26 after a helical movement produced under the effect of the inertia on the acceleration of the rocket. The helical movement is obtained by means of two male inclined portions 32 carried by the cylinder 26 and two female inclined portions 33 formed in the closing ring 30. The ring 30 has a flange 34 which serves, inter alia, as an inertia flywheel.

The delay-action arming device moreover includes an axially movable arming ring 35 guided by a stud 36 cooperating with a slot 37. This arming ring has a flange 38 cooperating with the flange 34 under the effect of an arming spring 39 to hold the closing ring 30 in the storage position. The closing ring 30 is moreover prevented from rotating by two locking studs 40 and 41 engaging in two bores 42 and 43 in the closing ring 30.

The delay-action arming device operates in the following manner (FIGS. 9 and 10).

On starting off of the rocket, the acceleration first causes a compression of the arming spring and a displacement of the arming ring. The studs 40, 41 are then disengaged from the closing ring 30 and this releases the latter (FIG. 9).

Still as a result of inertia, the closing ring 30 and the inertia flywheel 34 undergo a helical movement which brings the orifice 31 of the ring 30 opposite the outlet orifice 28 for the microballs. These microballs then pass out under the pressure of the plunger 27 due to the spring 29. A nonreturn finger 44 housed in a blind bore in the wall 45 of the track 12 of the slide 11 is engaged in a recess 46 in the inertia flywheel 34 under the action of a spring (not shown). As this flywheel cannot turn any longer, the ring 30 is prevented from moving back. The time that the microballs need to issue from the cylinder 26 corresponds to the duration of the delay. In fact, as soon as the plunger 27 has driven the microballs out of the cylinder, the rod 22 is completely retracted in front of the slide 11, which then comes into the arming position, as described hereinbefore (FIG. 11). An impact on the member 7 at the front of the fuse then supplies an electric pulse to the detonator.

The duration of the delay is preferably equal to 0.4 sec., which corresponds to a flight distance or path of 50 m. for a rocket. If, in consequence of an aiming error, the impact of the rocket occurs at less than 50 m. from the start, the rocket does not explode, because the detonator is not in the arming position. There is therefore great safety of operation.

The arming device also includes another improvement designed to prevent accidental dropping or an accidental shock or impact arming the rocket fuse.

To this end, the inertia flywheel has tow inclines 47, 48 on its face directed towards the flange 38 of the arming ring 35, each inclined beginning at the height of a bore 42, 43 intended to receive a locking stud 40, 41. When the acceleration of the rocket has not been great enough for the closing ring to be locked by the nonreturn finger 44 and, therefore, for the microballs to have been able to run out, the delay assembly resumes its initial state, because the locking studs 40 and 41, by bearing on said inclines 47 and 48 under the effect of the spring 39, cause a rotation and, simultaneously, a translation of the closing ring until the studs 40, 41 lock it again by engaging in the bores 42, 43.

I claim:

1. A rocket fuse with delayed arming action, comprising:
   a. a body,
   B. a slide movable within said body between a storage position and an armed position,
   c. a detonator carried by said slide, said detonator being operable only when said slide is in its armed position,
   d. means urging said slide to its armed position;
   e. an abutment preventing movement of said slide from its storage position to its armed position, and
   f. a delayed-action arming device for retracting said abutment to permit movement of said slide to its armed position, said delayed-action arming device including:
      I. a chamber defined by a fixed cylindrical wall having at least one orifice therein,
      II. a plunger within said chamber supporting said abutment,
      III. microballs within said chamber supporting said plunger,
      IV. resilient means urging said plunger in a direction for retracting said abutment and for pushing said balls out of said chamber through said orifice,
      V. a closing ring coaxial with and surrounding said cylindrical wall, said ring having at least one orifice and an exterior flange,
      VI. guide means for causing said closing ring to move helically with respect to said cylindrical wall between a storage position in which said closing ring closes said orifice in said wall and an armed position in which said orifices in said wall and ring are aligned so that said microballs can flow through said orifices out of said chamber,
      VII. an arming ring coaxial with and surrounding said closing ring, said arming ring being axially slidable with respect to said closing ring and having an interior flange, and
      VIII. resilient means urging said arming ring in a direction in which its interior flange engages said exterior flange of said closing ring and maintains the latter in its storage position, the initial movement of the rocket when fired causing said arming ring to move axially to compress said resilient means VIII and release the engagement between said flanges whereupon toe rotational movement of the rocket causes said closing ring to move helically to its armed position so that said microballs escape from said chamber and permit said resilient means IV to retract said abutment and allow said detonator-carrying slide to move to its armed position.

2. A rocket fuse as defined in claim 1 including means for preventing rotation of said arming ring, a bore in the flange of said closing ring, and a locking stud carried by the flange of said arming ring and being accommodated by said bore to prevent helical movement of said closing ring.

3. A rocket fuse as defined in claim 1 wherein said closing ring flange has a mass sufficient to serve as an inertia flywheel.

4. A rocket fuse as defined in claim 1 including a male helical member carried by said cylindrical wall, and a female helical means formed in said closing ring and cooperating with said helical member to produce helical movement of said closing ring.

5. A rocket fuse as defined in claim 1 wherein the face of said closing ring flange which faces said arming ring flange is formed with an inclined path which begins at said bore, said stud engaging said inclined path under the influence of resilient means VIII and returning said closing ring to its storage position after a partial movement of the latter toward its armed position.

* * * * *